United States Patent [19]

Stewart et al.

[11] Patent Number: 4,502,929

[45] Date of Patent: Mar. 5, 1985

[54] CORROSION PROTECTION METHOD

[75] Inventors: Ray F. Stewart; Michael Masia, both of Redwood City; Albert B. Macknick, Newark, all of Calif.

[73] Assignee: Raychem Corporation, Menlo Park, Calif.

[21] Appl. No.: 403,203

[22] Filed: Jul. 29, 1982

Related U.S. Application Data

[63] Continuation-in-part of Ser. No. 272,854, Jun. 12, 1981, abandoned.

[51] Int. Cl.³ .............................................. C23F 13/00
[52] U.S. Cl. ................................... 204/147; 204/196; 204/280; 204/291; 204/294
[58] Field of Search ............... 204/147, 148, 196, 197, 204/280, 294, 291

[56] References Cited

U.S. PATENT DOCUMENTS

| | | | |
|---|---|---|---|
| 1,842,541 | 1/1932 | Cumberland | 204/196 |
| 2,020,844 | 11/1935 | Magos et al. | 204/197 |
| 2,053,214 | 9/1936 | Brown | 204/196 |
| 2,491,225 | 12/1949 | Stearns | 204/147 |
| 3,022,242 | 2/1962 | Anderson | 204/196 |
| 3,151,050 | 9/1964 | Wilburn | 204/196 |
| 3,260,661 | 7/1966 | Kemp et al. | 204/197 |
| 3,332,867 | 7/1967 | Miller | 204/197 |
| 3,349,017 | 10/1967 | Ziegler | 204/147 |
| 3,354,063 | 11/1967 | Shutt | 204/197 |
| 3,391,072 | 7/1968 | Pearson | 204/197 |
| 3,410,772 | 11/1968 | Geld | 204/147 |
| 3,498,898 | 3/1970 | Bogart | 204/181 |
| 3,623,968 | 11/1971 | Bohne | 204/197 |
| 3,798,142 | 3/1974 | Evans | 204/196 |
| 3,868,313 | 2/1975 | Gay | 204/196 |
| 3,887,449 | 6/1975 | Baer | 204/148 |
| 3,977,956 | 8/1976 | Bagnulo | 204/196 |
| 4,091,291 | 5/1978 | Foster et al. | 204/196 |
| 4,098,967 | 7/1978 | Biddick | 429/210 |
| 4,186,075 | 1/1980 | Kempter | 204/294 |
| 4,196,064 | 4/1980 | Harms | 204/147 |
| 4,255,241 | 3/1981 | Kroon et al. | 204/147 |
| 4,267,029 | 5/1981 | Massarsky | 204/196 |
| 4,339,325 | 7/1982 | Solomon et al. | 204/296 |

FOREIGN PATENT DOCUMENTS

| | | |
|---|---|---|
| 2921167 | 5/1969 | Australia . |
| 0014030 | 6/1980 | European Pat. Off. . |
| 2839085 | 3/1980 | Fed. Rep. of Germany . |
| 7334293 | 10/1973 | Japan ................................. 204/196 |
| 0048948 | 5/1978 | Japan ................................. 204/196 |
| 7010559 | 1/1971 | Netherlands ...................... 204/196 |
| WO80/01488 | 1/1980 | PCT Int'l Appl. . |
| 875892 | 8/1961 | United Kingdom . |
| 1394292 | 5/1975 | United Kingdom . |
| 2008616 | 6/1979 | United Kingdom . |
| 2046789A | 11/1980 | United Kingdom . |
| 2053973A | 2/1981 | United Kingdom . |

OTHER PUBLICATIONS

European Search Report Appl. No. EP 82303022.6, U.K. Search Report 17000/82.
J. Coatings Technology, 50, Bingham et al., Mar., 1978, pp. 47-53.

*Primary Examiner*—T. Tung
*Attorney, Agent, or Firm*—Timothy H. P. Richardson

[57] ABSTRACT

Methods of preventing corrosion in which current flows between the to-be-protected substrate and a distributed electrode whose electrochemically active surface is provided by an element which is composed of a conductive polymer and which is at least 500 microns thick. In one embodiment, the electrode is a flexible strip comprising a highly conductive core, e.g. of copper, and a conductive polymer element surrounding the core. In another embodiment, the electrode is a conductive polymer layer which conforms to the surface of the substrate but is separated from it by a layer of insulation.

15 Claims, 7 Drawing Figures

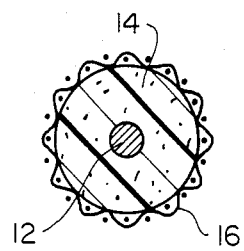
FIG_1
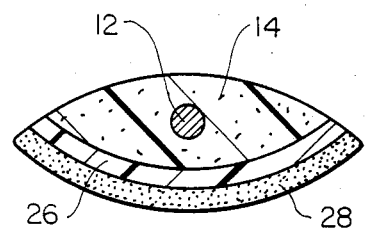
FIG_2
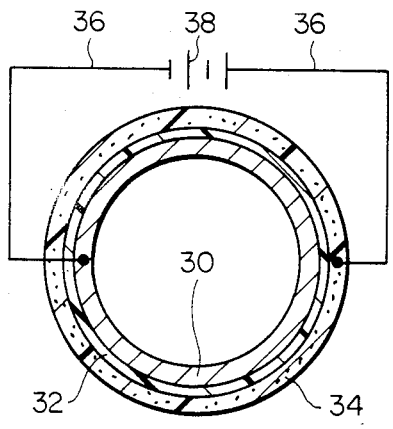
FIG_3
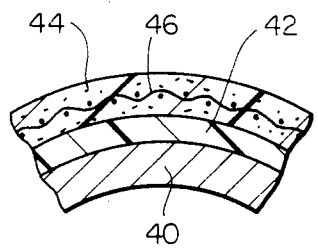
FIG_4
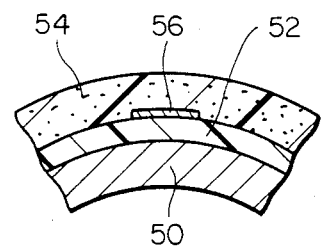
FIG_5

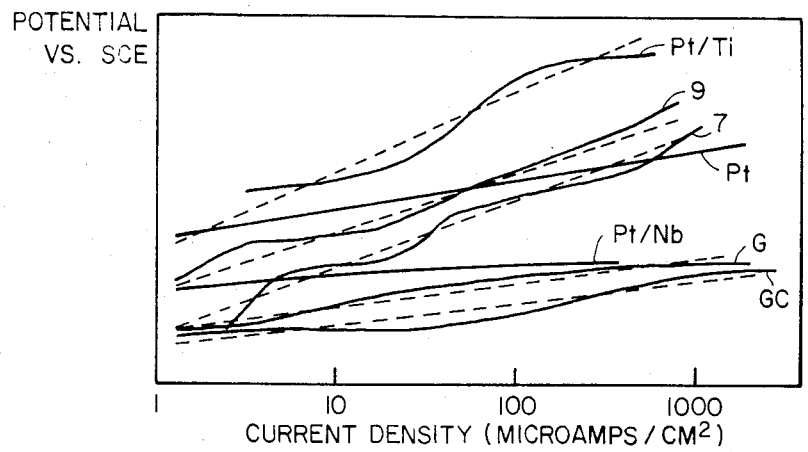
FIG_6
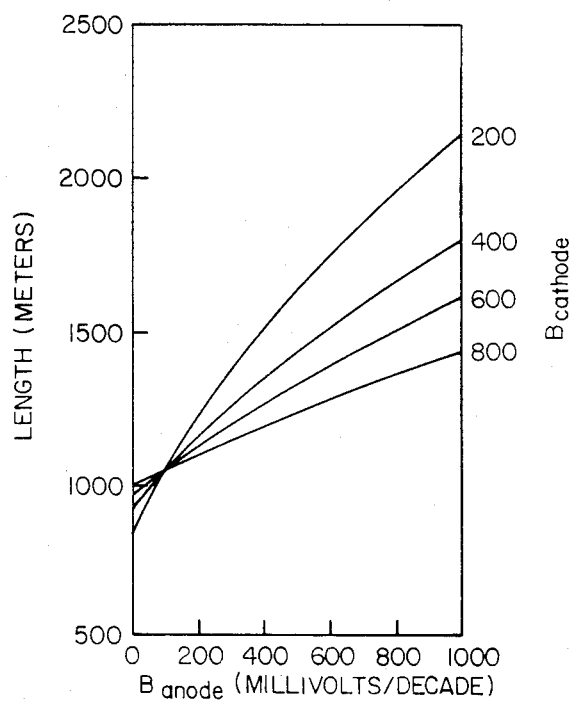
FIG_7

CORROSION PROTECTION METHOD

CROSS REFERENCE TO RELATED APPLICATION

This application is a continuation-in-part of our Application Ser. No. 272,854, filed June 12, 1981, now abandoned, the entire disclosure of which is incorporated herein by reference.

BACKGROUND OF THE INVENTION

1. Field of the Invention

This invention relates to methods of preventing corrosion and to apparatus for use in such methods.

2. Introduction to the Invention

It is well known to protect an electrically conductive substrate from corrosion by establishing a potential difference between the substrate and a spaced-apart electrode. The substrate and the electrode are connected to each other through a power supply of constant sign (DC or rectified AC) and the circuit is completed when electrolyte is present in the space between the substrate and the electrode. In most such impressed current systems, the substrate is the cathode (i.e. receives electrons). However, with substrates which can be passivated, e.g. Ni, Fe, Cr and Ti and their alloys, it is sometimes also possible to use impressed current systems in which the substrate is the anode. In both cathodic and anodic systems, the substrate is often provided with a protective insulating coating; in this case the impressed current flows only through accidentally exposed portions of the substrate. If the system is to have an adequate life, the electrode must not itself be corroded at a rate which necessitates its replacement; this is in contrast to the "sacrificial anodes" which are used in galvanic protection systems. The electrode must also have a surface which is not rendered ineffective by the current passing through it or by the electrochemical reactions taking place at its surface, such as the evolution of chlorine gas.

The electrode and the power supply must be such that the current density at all points on the substrate is high enough to prevent corrosion but not so high as to cause problems such as damage to the substrate (eg. embrittlement) or disbonding of a protective coating on it. The power consumption of the system depends inter alia on the distance between the various parts of the substrate and electrode. In view of these factors, the theoretically best type of electrode is one which has a shape corresponding generally to the shape of the substrate and which is relatively close to all points on the substrate. Such an electrode is referred to herein as a "distributed electrode". Distributed electrodes have been provided in the past, for example, by a layer of conductive paint which is coated over an electrically insulating coating on the substrate, or by a platinum-coated wire placed adjacent to the substrate (usually inside a pipe). However, the known distributed electrodes suffer from serious practical disadvantages. Conductive paints require careful, craft-sensitive application of the paint layer and of the insulating layer; and even when the layers are correctly applied, the paint (whose thickness is less than 200 microns, usually less 100 microns) can easily be damaged either by mechanical abrasion or by blistering or peeling due to passage of current. Furthermore, unless the paint is of very low resistivity (which makes it difficult to apply and/or very expensive and/or more liable to damage), either the size of the substrate is very limited or there must be bus bars between the paint and the insulating layer. Such bus bars, especially if exposed as a result of damage to the paint, are liable to corrosion. The disadvantages of platinum-coated wires are likewise numerous. Platinum is very expensive (which is of course why platinum-coated wires, rather than pure platinum wires, are used) and platinum coatings are very easily damaged, eg. by flexing of the wire. The use of platinum-coated wires is, therefore, restricted to situations in which such damage can be minimized. In addition, it is essential that the core of the wire, if exposed, is not liable to corrosion, and this further increases the cost of the electrode. In practice, platinum-coated wires comprise a core of titanium or niobium-coated copper.

Because of the difficulties associated with distributed electrodes, most practical impressed current corrosion protection systems make use of a plurality of discrete electrodes which are spaced apart at some distance from the substrate. Typically, the anodes are rigid rods which are composed of (a) graphite or (b) a thermoset resin or other rigid matrix which is highly loaded with graphite or other carbonaceous material. Because of the distance between the electrodes and the substrate, large power supplies are often needed and interference from other electrical systems (including other corrosion protection systems) is common. In addition, the high current density at the electrode can give rise to problems, eg. in dispersing gases generated by electrochemical reactions at the surface of the electrode.

SUMMARY OF THE INVENTION

We have now discovered that the disadvantages of known electrodes can be mitigated or overcome through the use of a distributed electrode whose electrically active outer surface is provided by an element which is composed of a conductive polymer and which is at least 500 microns, preferably at least 1000 microns, thick. The term "conductive polymer" is used herein to denote a composition which comprises a polymer component and, dispersed in the polymer component, a particulate conductive filler which has good resistance to corrosion, especially carbon black or graphite.

Accordingly, in one aspect the present invention provides a method of protecting an electrically conductive substrate from corrosion, which method comprises establishing a potential difference between the substrate and a distributed conductive polymer electrode as defined above.

BRIEF DESCRIPTION OF THE DRAWING

The invention is illustrated in the accompanying drawing, in which

FIGS. 1 and 2 are cross-sections through conductive polymer strip electrodes for use in the invention;

FIG. 3 is a cross-section of an insulated pipe surrounded by a conductive polymer electrode in the form of a layer;

FIGS. 4 and 5 show different methods of bussing a conductive polymer electrode in the form of a layer;

FIG. 6 shows, for a number of different electrodes, how current density varies with potential; and FIG. 7 shows how the maximum usable length of an anode varies with its current density/potential profile as shown for example in FIG. 6.

DETAILED DESCRIPTION OF THE INVENTION

It is often desirable to use the maximum possible length of electrode between power tap-in points. In investigating the use of conductive polymer electrodes in such situations, we realised that a property of an electrode material which we have called the "Quasi-Tafel Constant" and which is determined by tests as described below, has an important effect on the maximum length of the electrode that can be employed to produce a desired level of corrosion protection. The Quasi-Tafel Constant is closely related to, and can be the same as, the well-known Tafel Constant (see for example Pages 308–310 of "Corrosion Engineering" by Fontana and Greene, 2nd Edition, published in 1978 by McGraw Hill). However, the test method defined below takes into account other variables of a practical corrosion protection system.

For the most common corrosion problems, in which water containing salt (NaCl) is the corroding electrolyte, the relevant Quasi-Tafel Constant of the material at the surface of the electrode can be determined by the following procedure. A sample of the material having a known surface area, eg. of about 1 cm$^2$, is used as one electrode in an electrochemical cell containing a 5 molar solution of sodium chloride at 50° C. The other electrodes are carbon rods. The potential of the sample is measured using a saturated calomel electrode (SCE) and controlled by a potentiostat. The potential of the sample is adjusted to some desired level and the cell current is monitored. The current decays from a relatively large value to a steady state. The steady state current is measured. Measurements are made using voltages which produce steady state currents corresponding to the current densities which different parts of the electrode will have in the corrosion protection system. The potential is plotted against the log of the current density. The average slope of the plot is calculated (by a least squares fit) over a designated current density range and is expressed as millivolts/decade, i.e. the change in voltage (in millivolts) over which the current changes by a factor of 10.

Where references are made herein to particular values for a Quasi-Tafel Constant, they are measured by the method just described. However, for other corrosive mediums, a similar test can be carried out using the appropriate electrolyte. The higher the Quasi-Tafel Constant, the longer the usable length of the electrode, providing that the resistance of the electrode per unit length is sufficiently low. The conductive polymers which are preferably used in the present invention have a Quasi-Tafel Constant of at least 300, more preferably at least 400, particularly at least 500, millivolts/decade over a current density range of 1 to 500 microamps/cm$^2$.

In one embodiment of the invention, the electrode is in the form of a flexible strip comprising a low resistance core, eg. a metal wire, and a conductive polymer element which is in electrical contact with the core. By flexible is meant that the strip can be bent through an angle of 90° over a 10 cm radius, and back again, without damage. The length of the strip is many times, eg. at least 100 times, often at least 1000 times, its smallest dimension. The strip can be round or of any other cross-section. At least a part of the outer surface of the electrode is essentially active and is composed of conductive polymer.

It is often convenient to fix such flexible strip electrodes in physical contact with the substrate through an insulating element. For example, the strip can be wrapped around the outside of the substrate or fixed to the inside or outside of the substrate by any convenient means, for example with an adhesive, eg. a contact adhesive, a pressure-sensitive adhesive, a hot-melt adhesive or the like. When the substrate is magnetically receptive, eg. made of a ferrous metal, the strip electrode can comprise a magnetic strip (or a plurality of spaced-apart elements) composed of an electrically insulating, permanent magnet material through which the strip is magnetically secured to the substrate. On the other hand, fixing the strip in this way is usually less efficient (from the point of view of power consumption and corrosion protection) than positioning the strip a short distance away from the substrate. When the strip is placed inside the substrate, a generally central position is advantageous for obtaining uniform protection with minumum power consumption. When the strip is placed outside the substrate, it is usually placed as close to the substrate as is convenient and consistent with protecting the far side of the substrate. Generally the ratio $$b+D/a+D$$

will be less than 4, preferably less than 2, where b is the largest distance from the substrate to the electrode, a is the smallest distance from the substrate to the electrode and D is the largest dimension of the substrate in a plane at right angles to the axis of the electrode, eg. in the case of a pipe, its diameter.

A particularly preferred form of flexible electrode, which is novel per se and forms part of the present invention, comprises (1) a continuous, elongate flexible core which is composed of a material having a resistivity at 23° C. of less than $5 \times 10^{-4}$ ohm.cm, preferably less than $3 \times 10^{-5}$ ohm.cm, particularly less than $5 \times 10^{-6}$ ohm.cm, eg. copper or another metal, and which has a resistance at 23° C. of less than $10^{-2}$ ohm/ft (0.03 ohm/m), preferably less than $10^{-3}$ ohm/ft (0.003 ohm/m), particularly less than $10^{-4}$ ohm/ft (0.0003 ohm/m); and (2) an element which
  (i) is in electrical contact with the core;
  (ii) is composed of a conductive polymer having an elongation of at least 10%;
  (iii) provides substantially the whole of the electrochemically active outer surface of the electrode; and
  (iv) has a thickness of at least 500 microns, preferably at least 1000 microns.

It is to be noted that the core of an electrode as defined above does not form part of the electrochemically active outer surface of the electrode, which is provided solely by the conductive polymer element (2). Furthermore, the thickness and elongation of element (2) are such that accidental exposure of the core is extremely unlikely. The core can therefore be selected for its low resistance and physical properties, without worrying about corrosion thereof. The core can be a single wire, which is preferably stranded, or there can be a plurality of separate core elements which together make up the core.

Contact between the conductive polymer surface of the electrode and a conducting surface of the substrate to be protected should be avoided and for some uses, the electrode preferably comprises an electrolyte-permeable non-conducting shield over the electrochemically active surface. Such a shield can be provided by a shielding element, eg. a braid or mesh or perforated tube, which is composed of an electrically insulating material and provides 10 to 95%, usually 10 to 50%, of the total outer surface of the electrode.

In another embodiment of the invention, the electrode is in the form of a layer of conductive polymer which is secured to an insulating layer on the substrate. The layer of conductive polymer can be applied in any manner, for example by wrapping a conductive polymer tape around the substrate. A preferred way of applying the conductive polymer is to make a recoverable article comprising the conductive polymer and then to recover the article around the substrate. The insulating layer can be formed on the substrate as a separate operation or the insulating and conductive layers can be applied together. When the conductive polymer is applied as (or as part of) a recoverable article, the article may be, for example, heat-recoverable or solvent-recoverable or elastomeric.

In order to obtain adequate distribution of the impressed current over the conductive polymer layer, it is often necessary for bus bars to be placed between the conductive layer and the insulating layer or within the conductive layer.

In this embodiment, the impressed current does not begin to flow unless the substrate is exposed to electrolyte through a hole in the layers covering it. The conductive layer can therefore be the outer layer which is directly exposed to electrolyte, or it can be covered by an insulating layer.

Conductive polymers are well known, eg. for use in electrical heaters and circuit control devices, and conductive polymers suitable for use in the present invention can be selected from known materials having regard to the disclosure in this specification.

The resistivity of the conductive polymer at 23° C. is preferably 0.1 to $10^3$ ohm.cm, particularly 1 to 100 ohm.cm, especially 1 to 50 ohm.cm. If the amount of conductive filler is increased too much, eg. so that the conductivity is below 0.1 ohm.cm., the physical properties, especially elongation, of the polymer become unsatisfactory and the polymer is difficult to shape. If the resistivity is more than $10^3$ ohm.cm, the electrode often fails to meet current density requirements. The conductive polymer will preferably pass a current density of at least 1 mA/cm$^2$, more preferably at least 10 mA/cm$^2$, under the conditions of ASTM G5-72 (sample polarised to $+3.0$ volts versus an SCE in 0.6 molar KCl solution at 25° C.).

So that the electrode has good flexibility, the conductive polymer preferably has an elongation of at least 10%, particularly at least 25%, as determined by the method of ASTM D 1708 on a pressed film sample (2.23×0.47×0.13 cm) at a cross-head speed of 5 cm/min.

So that the conductive polymer can easily be shaped, it preferably has a melt viscosity at its processing temperature [which is preferably within 30° C. of its softening point (melting point for a crystalline polymer)] of less than $10^8$ poise, particularly less than $10^7$ poise. [Melt viscosities referred to herein are measured with a mechanical spectrometer on a pressed film sample 1 mm thick, using parallel plate geometry at 10% strain and a shear rate of 1 radian/second.] Shaping of the conductive polymer is preferably carried out by an extrusion process. Shaping should be effected in a way which ensures that the conductive filler is present in satisfactory amounts on the exposed surface of the electrode.

The polymeric matrix of the conductive polymer can be composed of one or more polymers, which may be thermoplastics, rubbers or thermoplastic rubbers, and which are preferably selected so that they do not degrade when the electrode is in use. Suitable polymers include olefin homopolymers and copolymers, eg. polyethylene and ethylene/ethyl acrylate copolymers; fluorinated polymers, eg. polyvinylidene fluoride and vinylidene fluoride/hexafluoropropylene copolymers; chlorinated polyolefins, eg. chlorinated polyethylene; and acrylate rubbers.

The conductive filler of the conductive polymer must have good resistance to corrosion. Metal fillers are, therefore, generally to be avoided for use with most corrosive liquids. Carbonaceous fillers, especially carbon black and graphite, are preferred. Other fillers which may be useful under suitable circumstances include metallic oxides, eg. magnetite, lead dioxide and nickel oxide. The filler is preferably particulate with a largest dimension less than 0.1 mm, particularly less than 0.01 mm; the filler may contain, in addition, a minor proportion, eg. up to 30% by weight, of a fibrous filler, the length of the fibers usually being less than 0.6 cm.

The conductive polymer can also contain other conventional ingredients such as antioxidants, non-conducting fillers and process aids.

The conductive polymer can be cross-linked, eg. chemically or by irradiation.

Substrates which can be protected by the present invention include pipes, lead-sheathed telephone cables, well-casings, reinforcing bars in concrete (strip electrodes can be laid down with the reinforcing bars and the concrete cast around them) and tanks and vessels containing corrosive fluids. The substrate can for example be buried in soil or immersed in sea water or exposed to the atmosphere (when corrosion is caused, for example, by rain or sea spray). The substrate will often be composed of ferrous metal, but many other conductive substrates can be protected. Two or more electrodes can be used to protect the same substrate. The electrodes can be powered from both ends or from only one end, in which case the far end of the electrode is preferably sealed, eg. by a heat-shrinkable end cap.

Referring now to the drawings, FIGS. 1 and 2 are cross-sections through strip electrodes comprising a highly conductive core 12 which is surrounded by a conductive polymer element 14. In FIG. 1, the element 14 is surrounded by polymeric braid 16. In FIG. 2 one side of element 14 is covered by insulating layer 26 which is in turn coated with adhesive 28, making the electrode suitable for sticking to a substrate.

FIG. 3 is a cross-section through a pipe 30 which is protected by means of a conductive polymer electrode 34 formed by shrinking a conductive polymer tube around an insulating layer 32 surrounding the pipe. The pipe 30 and the electrode 34 are connected by leads 36 to battery 38. FIGS. 4 and 5 show different methods of bussing a conductive polymer electrode in the form of a sheet, eg. as shown in FIG. 3. In FIG. 4, metal mesh 46 is embedded in a conductive polymer layer 46 which is separated from pipe 40 by insulating layer 44. In FIG. 5, metal strip 56 is placed between conductive polymer layer 54 and insulating layer 52 which surrounds pipe 50. The bus 56 can be stuck to the insulating layer 52 by an insulating adhesive (not shown) and to the conductive layer 54 by a conducting adhesive (not shown).

FIG. 6 shows, for a number of different electrode materials, the results obtained by the procedure described above for measuring the Quasi-Tafel Constant. Results are shown for conductive polymer compositions 7 and 9 in the Examples below (labelled 7 and 9 respectively), for a platinum disc (labelled Pt), for a platinum-coated wire in which the core is niobium-coated copper (labelled Pt/Nb), for a platinum-coated wire in which the core is titanium (labelled Pt/Ti), for a graphite electrode (labelled G), and for a glassy carbon electrode (labelled GC). The dashed lines in FIG. 6 are the Quasi-Tafel Constants. The vertical axis of FIG. 6 shows the voltage on the same scale for all the electrodes, but for clarity (since it is the slope of the plot, not its absolute position, which is important) some of the plots have been transposed vertically. It will be noted that the conductive polymer electrodes have substantially higher Quasi-Tafel Constants than the known electrodes, with the exception of platinum-coated titanium wire. However, quite apart from its high cost, platinum-coated titanium wire is not very satisfactory as a long line electrode, because of the relatively high resistivity of the titanium core and because the plot in FIG. 6 has a high slope at low current densities but a low slope at the current densities in the range of 150–500 microamps/cm$^2$ most likely to be used in practice over the length of most of the electrode.

FIG. 7 shows how the maximum usable length of an anode varies with the Tafel Constants of the anode and the cathode ($B_{anode}$ and $B_{cathode}$) respectively, making reasonable assumptions as to numerous variables in a practical system, eg. the resistance per unit length of the anode and substrate, the geometry of the system, the resistivity of the electrolyte and the current densities required for adequate protection. In constructing FIG. 7, it was assumed that the anode and cathode would give straight line plots in FIG. 6. This is not in fact always strictly true, but FIG. 7 remains substantially correct when a measured Quasi-Tafel Constant is used. For any particular system, once the different variables have been defined, a figure like FIG. 7 can be constructed to show how the maximum usable length of the anode varies with the Tafel Constant.

The invention is illustrated by the following Examples, in which parts and percentages are by weight. The ingredients of the conductive polymers used in the Examples are set out in the Table 1 below. They were mixed together in a Banbury or Brabender mixer until a uniform mixture had been obtained. The resistivities given in the Table were measured on slabs pressed from the various mixtures.

TABLE 1

| Composition No. | 1 | 2 | 3 | 4 | 5 | 6 | 7 | 8 | 9 | 10 |
|---|---|---|---|---|---|---|---|---|---|---|
| Polymers | | | | | | | | | | |
| Thermoplastic Rubber | 60 | | | 44.8 | 45 | 65 | 44.8 | 45 | | |
| Polyethylene | | 24 | | | | | | | | |
| Ethylene/acrylic acid copolymer | | 36 | | | | | | | | |
| Polyvinylidene fluoride | | | 68 | | | | | | 36.5 | |
| Vinylidene fluoride/hexafluoropropylene copolymer | | | 6 | | | | | | | |
| Chlorinated polyethylene | | | | | | | | | | 65 |
| Acrylate rubber | | | | | | | | | 24.4 | |
| Conductive Filler | | | | | | | | | | |
| Shawinigan Acetylene Black | 40 | | | 50 | | | | | 32 | 35 |
| Statex N 765 Carbon Black | | 40 | | | | | | | | |
| Furnex N 765 Carbon Black | | | 23 | | 55 | 35 | 50 | 55 | | |
| Additives | | | | | | | | | | |
| Antioxidant | | | | 0.2 | | | 0.2 | 0.1 | | |
| Radiation cross-linking agent | | | 1 | | | | | | | |
| Processing Aid | | | | 5.0 | | | 5.0 | 4.0 | | |
| Calcium Carbonate | | | 2 | | | | | 3.0 | | |
| Resistivity at 23° C. (ohm · cm) | 20 | 4 | | 11.4 | | 12.5 | 2.5 | 0.6 | 2.0 | 29 |

The various ingredients are further identified as follows. The thermoplastic rubber was Uniroyal TPR 1900 in Composition 1 and Uniroyal TPR 5490 in Compositions 4, 5, 6, 7 and 8. The polyvinylidene fluoride was Pennwalt Kynar 460 in Composition 3 and Solvay Solef 1010 in Composition 9. The vinylidene fluoride/hexafluoropropylene copolymer was Du Pont Viton AHV. The chlorinated polyethylene was Dow CPE-12 II. The acrylate rubber was Goodrich Hycar 4041.

Table 2 below gives the Quasi-Tafel Constants for Compositions 4 and 6–10 and for various commercially available electrodes.

TABLE 2

| | Quasi-Tafel Constant |
|---|---|
| Composition 4 | 462 |
| Composition 6 | 472 |
| Composition 7 | 530 |
| Composition 8 | 449 |
| Composition 9 | 689 |
| Composition 10 | 330 |
| Platinum Disk | 45 |
| Glassy Carbon electrode | 165 |
| Graphite Rod | 211, 177 & 166 |
| Platinum on Niobium-coated Copper wire | 119 & 74 |
| Platinum on titanium wire | 919 & 633 |

EXAMPLE 1

An electrode was made by melt-extruding Composition 1 around a nickel-plated copper stranded wire (19 strands, 20 gauge, diameter 0.1 cm) to give an electrode of 0.63 cm diameter.

A 30 cm length of steel pipe of diameter 5 cm was covered by heat-shrunk insulating polyethylene tubing. In the middle of the pipe, a 1.25 cm wide strip of the tubing was removed, exposing 20 cm$^2$ of the pipe. A 30 cm length of the electrode was secured to the pipe, making sure that no contact was made between the exposed pipe and the electrode. One end of the electrode was connected to a DC power supply, to which one end of the pipe was also connected. The other end of the electrode was insulated by a polymeric end cap. The pipe and electrode were immersed in sea water, and the power supply adjusted to maintain the pipe at a voltage of 0.92 volts cathodic to an SCE. No rust was visible on the exposed portion of the pipe after 60 days.

A pipe which was similarly treated, but not protected from corrosion, showed rusting within 24 hours.

EXAMPLE 2

1.9 m of the electrode of Example 1 was buried in soil of 3000 ohm.cm resistivity and pH 5.2. 5 cm above the electrode, a 5 cm diameter steel pipe was buried in the same soil to a depth of 10 cm. The pipe was coated with insulating material except over an exposed surface of 100 cm$^2$. The free corrosion potential of the pipe was −0.56 volts relative to a saturated copper-copper sulfate electrode. The pipe and anode were connected to a DC power supply which was adjusted daily to maintain the pipe at −1.0 volts relative to the copper-copper sulfate electrode. After 12 days, the current flow was 4.6 mA. The level of protection obtained satisfied NACE Standard RP-10-69, paragraphs 6.3.1.1 to 6.3.1.3.

EXAMPLE 3

30 cm of the electrode of Example 1, covered by a nylon braid, was placed inside a 30 cm length of 10 cm diameter steel pipe whose interior was coated with epoxy resin except over a 0.6 cm wide strip. The pipe was filled with sea water and polarized to −0.92 volts relative to an SCE. The current required was 1.21 mA initially and 0.7 mA after 68.5 hours. Over 60 days (during which time the sea water was replenished occasionally), no rust formed on the protected pipe. In a control pipe which was similarly treated but not protected from corrosion, large quantities of rust appeared.

EXAMPLE 4

After attaching an electrical lead thereto, a 2.5×7.5 cm piece of sheet steel was covered with an insulating adhesive. A 2.5×7.5×0.04 cm conductive sheet prepared from Composition 2 was stuck to the adhesive, and an insulated electrical lead was attached to the conductive sheet. A section of the steel, 0.63 cm in diameter, was exposed by cutting through the conductive sheet and underlying adhesive. A drop of water containing 3.5% NaCl was placed on the exposed steel and made contact with the conductive sheet. The leads were connected to a DC power supply and the steel polarized to −0.96 volts relative to an SCE. A control sample was similarly constructed except that an insulating polyethylene sheet was used instead of the conductive sheet. Both samples were tested in accordance with ASTM G44-75. After 24 hours, the control sample was corroded and the protected sample was not.

EXAMPLE 5

Composition 3 was extruded as a 4.6 cm diameter 0.8 mm thick tube. The tube was irradiated to 10 Megarads and then expanded to 8.3 cm diameter and cooled in the expanded state to make it heat-shrinkable. A 30 cm length of 5 cm diameter steel pipe was sand-blasted and solvent-wiped, and then insulated by shrinking over it a heat-recoverable insulating polymeric sleeve lined with a hot melt adhesive. A patch of insulating adhesive was applied to one side of the insulated pipe and a copper bus bar placed on the opposite side. The tubing prepared from Composition 3 was shrunk onto the insulated pipe, and one end of the assembly covered with a heat-shrinkable end cap. A section of the pipe 0.63 cm in diameter was exposed by cutting through the covering layers, including the patch of adhesive. The pipe was placed in an aqueous salt solution (1% NaCl, 1% Na$_2$SO$_4$, 1% Na$_2$CO$_3$) such that the exposed pipe was completely wetted, and the pipe and bus bar were connected to a DC power supply such that the pipe was maintained at 1.425 volts cathodic to an SCE. A potential of 3 volts was required, and produced a current of 2.5 mA. No rust appeared on the exposed pipe during a 48 hour test period.

EXAMPLE 6

A polarization curve was prepared for a cylindrical sample (0.953 cm diameter) of Type 430 stainless steel immersed in H$_2$SO$_4$, 1.0 normal, using a graphite cathode, following the procedure of ASTM G-5 except that the temperature was 23° C. and the graphite electrode was used instead of a platinum electrode. It was found that a voltage of 0.45 volts relative to an SCE was the point of greatest anodic protection.

An electrode as in Example 1 was then used to provide anodic protection for the cylindrical sample. The immersed surface area of the electrode was 10 cm$^2$ and the immersed surface area of the sample was 5.1 cm$^2$. The electrode and the sample were connected to a DC power supply and the sample was maintained at a potential of 0.446 volts relative to an SCE for 48 hours; at the steady state, the average current was about 2 microamps. The weight loss of the sample was about 0.16%. A similar sample, unprotected, suffered a weight loss of about 26%.

We claim:

1. A method of cathodically protecting an elongate, electrically conductive substrate which is buried in soil, which method comprises establishing a potential difference between the substrate as cathode and a distributed elongate anode which is buried in the soil adjacent to the substrate and spaced apart from the substrate by soil, the anode comprising a flexible strip comprising
   (1) a continuous elongate flexible metal core which has a resistance at 23° C. of less than 0.03 ohm/meter; and
   (2) an elongate element which
      (i) is in electrical contact with the core;
      (ii) is composed of a conductive polymer having an elongation of at least 10% and a resistivity at 23° of 0.1 to 10$^3$ ohm.cm;
      (iii) provides substantially the whole of the electrochemically active surface of the flexible strip; and
      (iv) is at least 500 microns thick.

2. A method according to claim 1 wherein the conductive polymer element is at least 1000 microns thick.

3. A method according to claim 1 wherein the anode has Quasi-Tafel Constant of at least 300 millivolts/decade over a current density range of 1 to 500 microamps/cm$^2$.

4. A method according to claim 3 wherein the anode has a Quasi-Tafel Constant of at least 400.

5. A method according to claim 4 wherein the anode has a Quasi-Tafel Constant of at least 500.

6. A method according to claim 1 wherein the conductive polymer has a resistivity of 1 to 100 ohm.cm.

7. A method according to claim 1 wherein the conductive polymer contains carbon black or graphite as a conductive filler.

8. A method according to claim 1 wherein the conductive polymer will pass a current density of at least 10 milliamps/cm$^2$.

9. A method according to claim 1 wherein the anode is in the form of a flexible strip which has a constant cross-section along its length and which consists essentially of the metallic core and the conductive polymer element surrounding the core.

10. A method according to claim 1 wherein the ratio $$b+D/a+D$$

is less than 2, where
- b is the largest distance from the substrate to the electrode,
- a is the smallest distance from the substrate to the electrode, and
- D is the largest dimension of the substrate in a plane at right angles to the axis of the electrode.

11. A method according to claim 10 wherein the substrate is a metal pipe having a diameter D.

12. A method of cathodically protecting metal reinforcing bars encased in a mass of concrete, which method comprises establishing a potential difference between the reinforcing bars as cathode and a distributed anode which lies within the mass of concrete adjacent to the reinforcing bars and spaced apart from the reinforcing bars by concrete, the anode comprising a flexible strip comprising
- (1) a continuous elongate flexible metal core which has a resistance at 23° C. of less than 0.03 ohm/meter; and
- (2) an elongate element which
  - (i) is in electrical contact with the core;
  - (ii) is composed of a conductive polymer having an elongation of at least 10% and a resistivity at 23° C. of 0.1 to 10$^3$ ohm.cm;
  - (iii) provides substantially the whole of the electrochemically active outer surface of the flexible strip; and
  - (iv) is at least 500 microns thick.

13. A method according to claim 12 wherein the electrode has a Quasi-Tafel Constant of at least 300 millivolts/decade over a current density range of 1 to 500 microamps/cm$^2$.

14. A method according to claim 13 wherein the electrode has a Quasi-Tafel Constant of at least 400.

15. A method according to claim 12 wherein the conductive polymer has a resistivity of 1 to 100 ohm.cm and the conductive polymer contains carbon black or graphite as conductive filler.

* * * * *